United States Patent
Choe et al.

(10) Patent No.: US 12,170,979 B2
(45) Date of Patent: Dec. 17, 2024

(54) METHOD AND APPARATUS FOR PAGING PROCEDURE CONSIDERING NETWORK SLICING IN A WIRELESS COMMUNICATION SYSTEM

(71) Applicant: LG ELECTRONICS INC., Seoul (KR)

(72) Inventors: Hyunjung Choe, Seoul (KR); Seungjune Yi, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 316 days.

(21) Appl. No.: 17/706,489

(22) Filed: Mar. 28, 2022

(65) Prior Publication Data

US 2022/0312370 A1    Sep. 29, 2022

(30) Foreign Application Priority Data

Mar. 29, 2021  (KR) .................. 10-2021-0040556

(51) Int. Cl.
*H04W 68/00*    (2009.01)
*H04W 48/18*    (2009.01)
(52) U.S. Cl.
CPC ......... *H04W 68/005* (2013.01); *H04W 48/18* (2013.01)
(58) Field of Classification Search
None
See application file for complete search history.

(56) References Cited

U.S. PATENT DOCUMENTS

2018/0376444 A1*  12/2018  Kim ................ H04W 68/02
2020/0260384 A1*  8/2020  Ryu ................ H04W 76/27

OTHER PUBLICATIONS

3rd Generation Partnership Project (3GPP), "Technical Specification Group Radio Access Network; NR; NR ad NG-RAN Overall Description; Stage 2 (Release 16)," Section 9.2.5 of 3GPP TS 38.300 V16.4.0, Dec. 2020, 149 pages.
3rd Generation Partnership Project (3GPP), "Technical Specification Group Radio Access Network; NR; NR ad NG-RAN Overall Description; Stage 2 (Release 16)," Section 16.3 of 3GPP TS 38.300 V16.4.0, Dec. 2020, 149 pages.
3rd Generation Partnership Project (3GPP), "Technical Specification Group Radio Access Network; NR; Radio Resource Control (RRC) protocol specification (Release 16)," Section 5.3.2 of 3GPP TS 38.331 V16.3.1, Jan. 2021, 932 pages.

* cited by examiner

*Primary Examiner* — Frantz Bataille
(74) *Attorney, Agent, or Firm* — LEE, HONG, DEGERMAN, KANG & WAIMEY

(57) ABSTRACT

A method and apparatus for paging procedure considering network slicing in a wireless communication system is provided. A wireless device receives, from a network, a paging message including information related to a mobile terminated (MT) service. A wireless device transmits, to the network, a paging response message including information on Single-Network Slice Selection Assistance Information (S-NSSAI) for the MT service. A wireless device receives, from the network, the MT service from a cell related to the S-NSSAI. The cell is determined based on the paging response message.

8 Claims, 19 Drawing Sheets

METHOD AND APPARATUS FOR PAGING PROCEDURE CONSIDERING NETWORK SLICING IN A WIRELESS COMMUNICATION SYSTEM

CROSS-REFERENCE TO RELATED APPLICATIONS

Pursuant to 35 U.S.C. § 119(a), this application claims the benefit of earlier filing date and right of priority to Korean Patent Application No. 10-2021-0040556, filed Mar. 29, 2021, the contents of which are hereby incorporated by reference herein in its entirety.

BACKGROUND

Technical Field

The present disclosure relates to a method and apparatus for paging procedure considering network slicing in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

Technical Objects

In NR, network slicing may be supported. A particular service may be provided using a particular network slice.

In order to receive a service, the UE should be in a cell supporting the network slice assigned to the service. If the UE is not in a cell supporting the network slice, the UE needs to move to another cell supporting the network slice. For slice-aware mobility, the UE may perform slice-aware cell selection/cell reselection, or the network may request slice-aware handover/redirection to the UE.

Paging allows the network to reach UEs in RRC_IDLE and in RRC_INACTIVE state through paging messages for system information modification, public warning message indication, or DL data arrival.

Upon reception of a paging message, the UE may not know the purpose of the paging procedure triggered by the network. In addition, the UE may not know whether the serving cell supports the network slice assigned to the service for DL data. Thus, paging enhancement, for example, a paging including S-NSSAI for DL data, has been discussed.

However, the panging including S-NSSAI may cause some problems, such as paging overhead, paging response delay, and mobility to a cell not support the network slice assigned to the particular service.

Therefore, studies for a paging procedure considering network slicing in a wireless communication system are required.

Technical Solutions

In an aspect, a method performed by a wireless device in a wireless communication system is provided. A wireless device receives, from a network, a paging message including information related to a mobile terminated (MT) service. A wireless device transmits, to the network, a paging response message including information on Single-Network Slice Selection Assistance Information (S-NSSAI) for the MT service. A wireless device receives, from the network, the MT service from a cell related to the S-NSSAI. The cell is determined based on the paging response message.

In another aspect, an apparatus for implementing the above method is provided.

Technical Effects

The present disclosure can have various advantageous effects.

According to some embodiments of the present disclosure, a wireless device could perform paging procedure considering network slicing efficiently.

According to some embodiments of the present disclosure, the UE may transmit the intended slice information for DL data in a paging response message, so that the network can quickly decide, without UE context, whether the UE needs to move to another cell or the UE can provide MT service in the serving cell. This mechanism can reduce paging overhead and make the network controlled mobility possible during a paging procedure.

In other words, according to the present disclosure, the paging overhead could be reduced by not including the S-NSSAI in the paging. In addition, the mobility delay could be reduced because the network could control the UE mobility without the UE context retrieving procedure.

For example, the paging overhead can be reduced by receiving the short identity for the wireless device to distinguish only the MT service type.

For example, by transmitting the network slice information of the wireless device in the paging response, the network can determine whether the mobility of the wireless device is required before UE context retrieving process.

For example, delay for providing service can be shortened by quickly moving to a cell that can provide the service when necessary.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
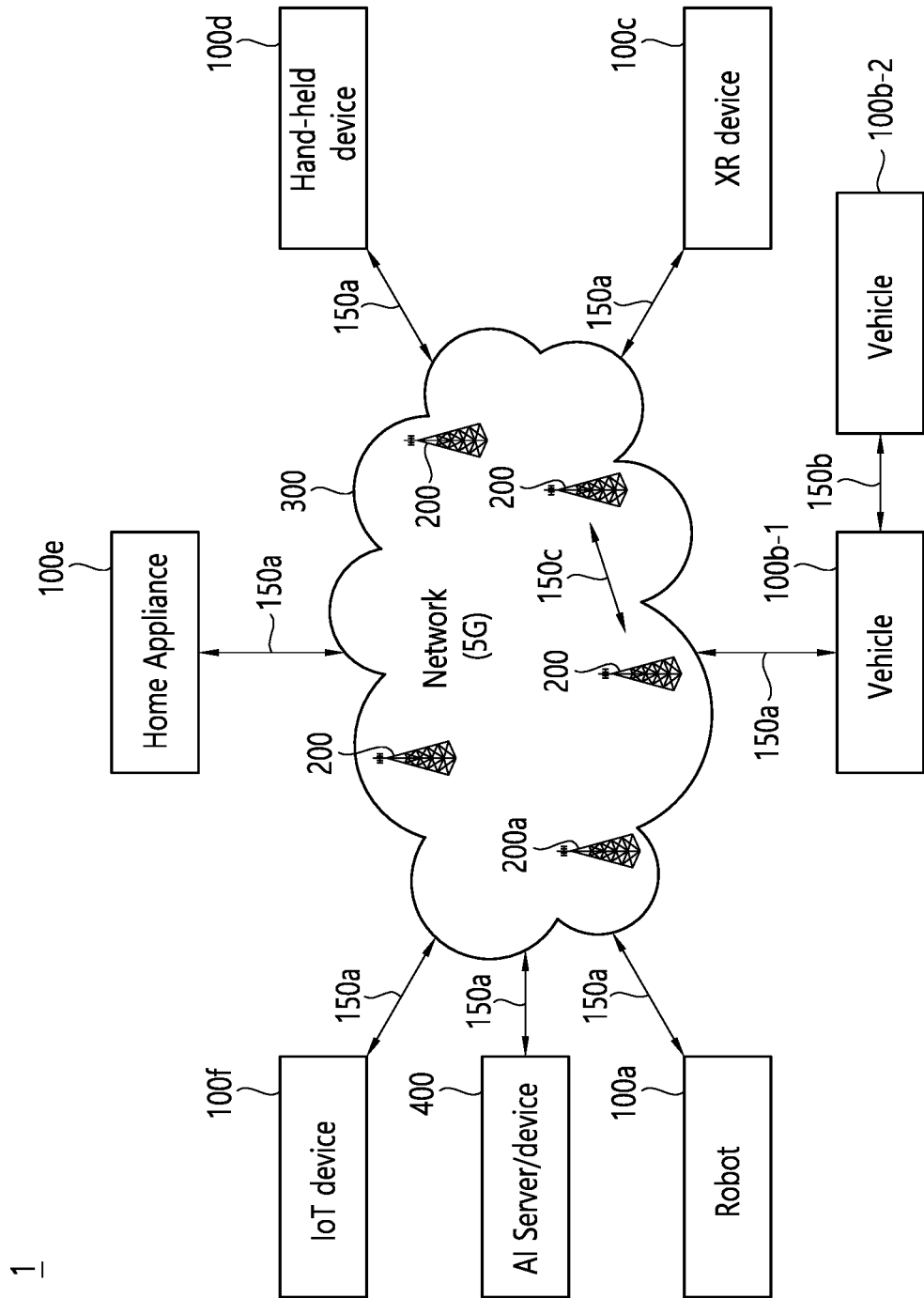
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
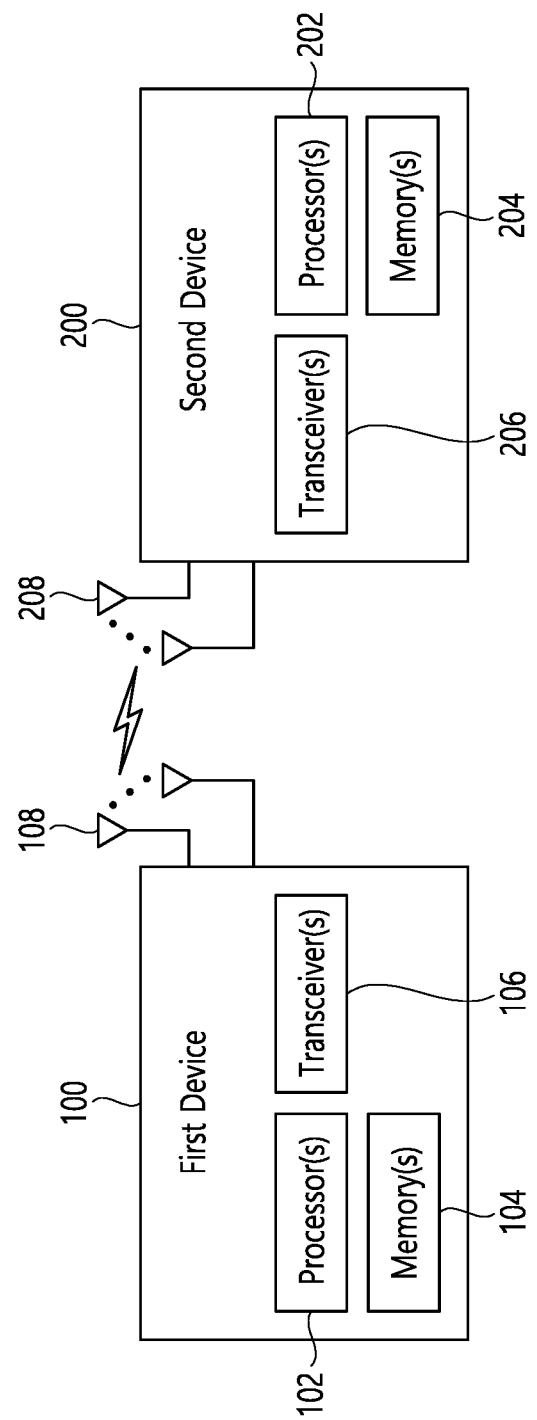
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. As an example, descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
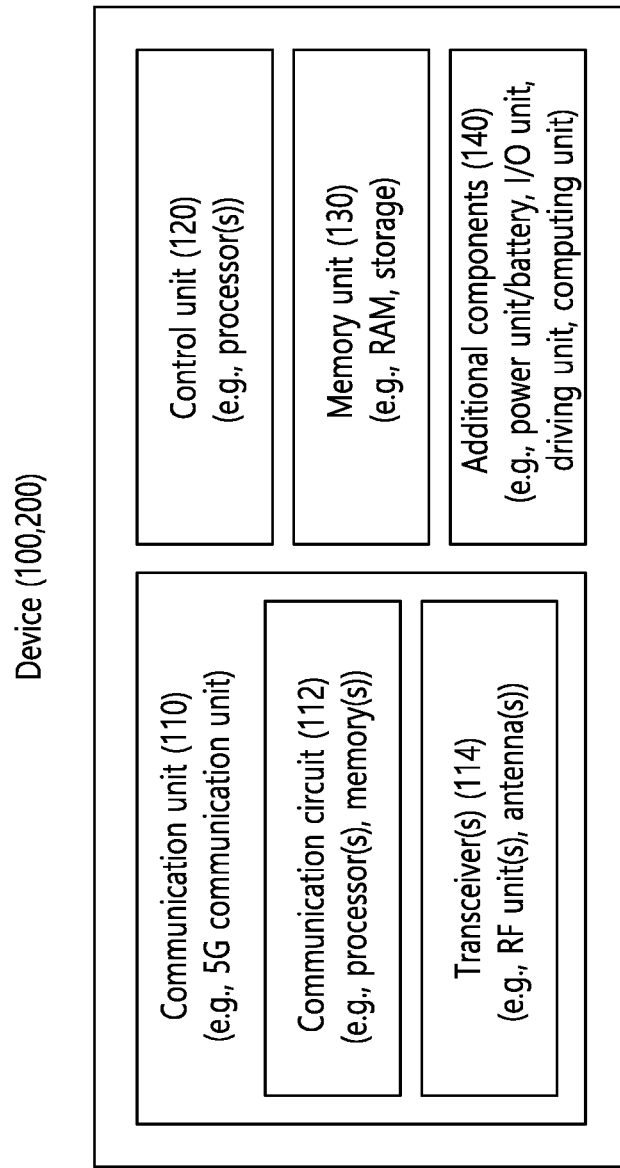
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors.

As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
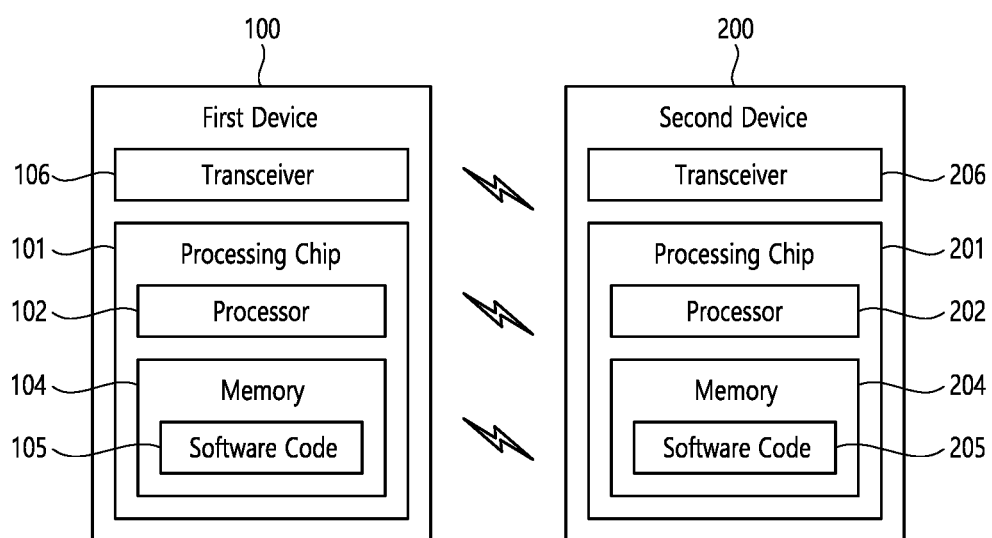
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
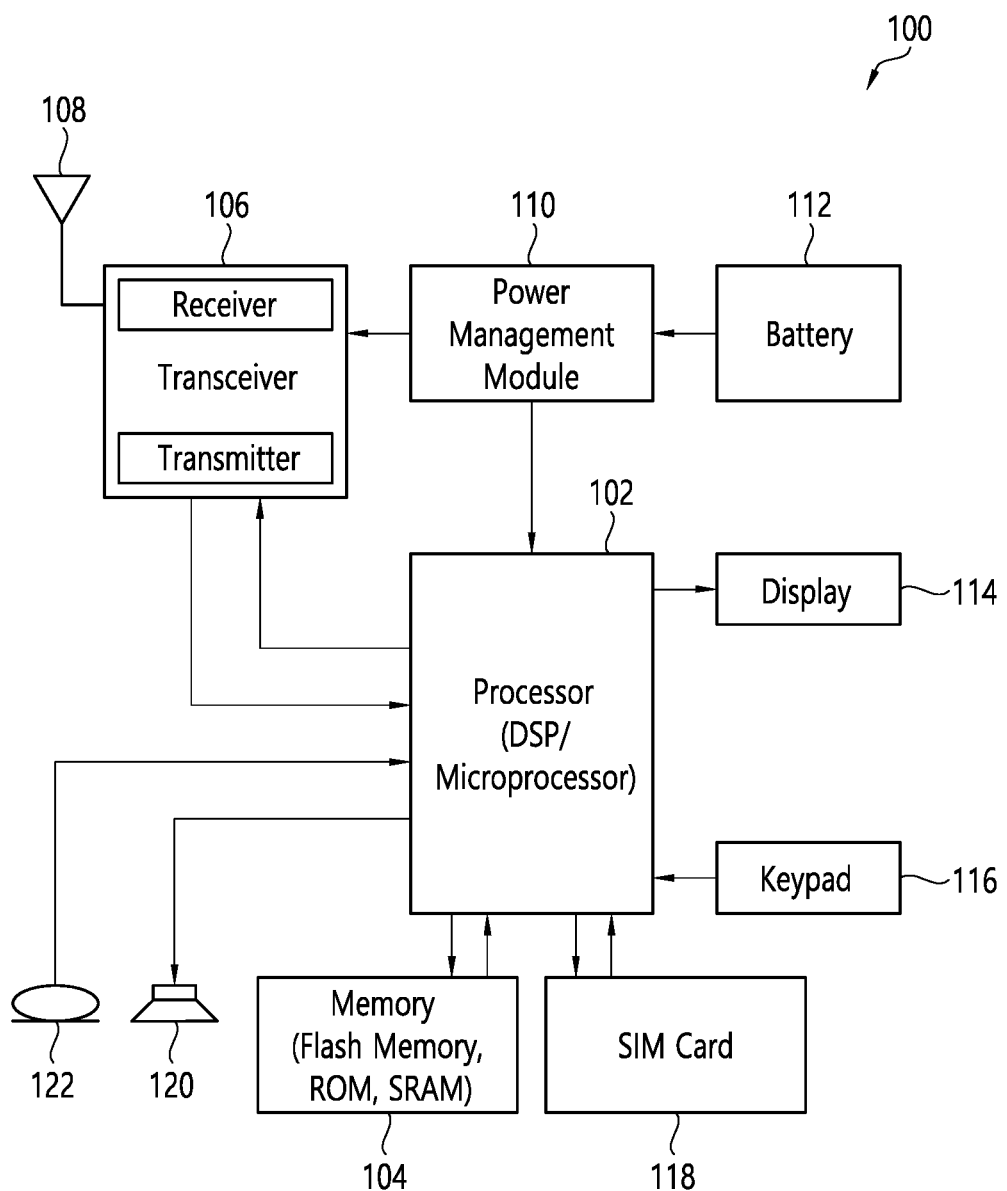
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
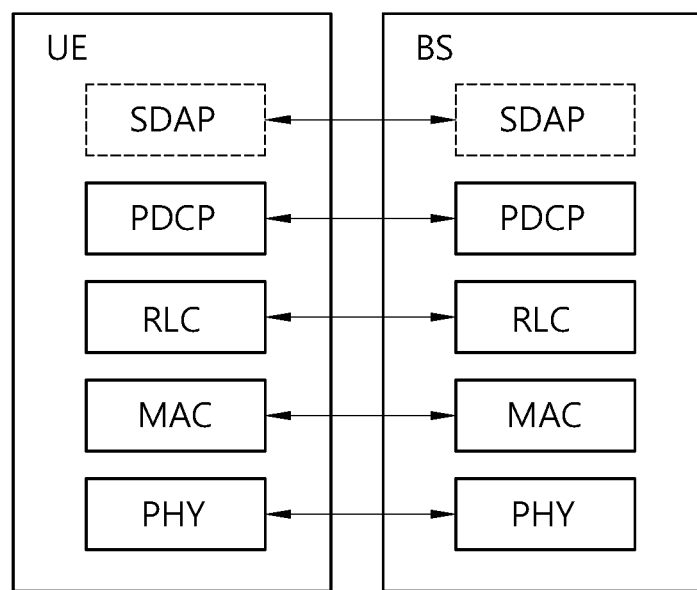
FIGS. 6 and 7 show an example of protocol stacks in a 3GPP based wireless communication system to which implementations of the present disclosure is applied.
Figure 7:
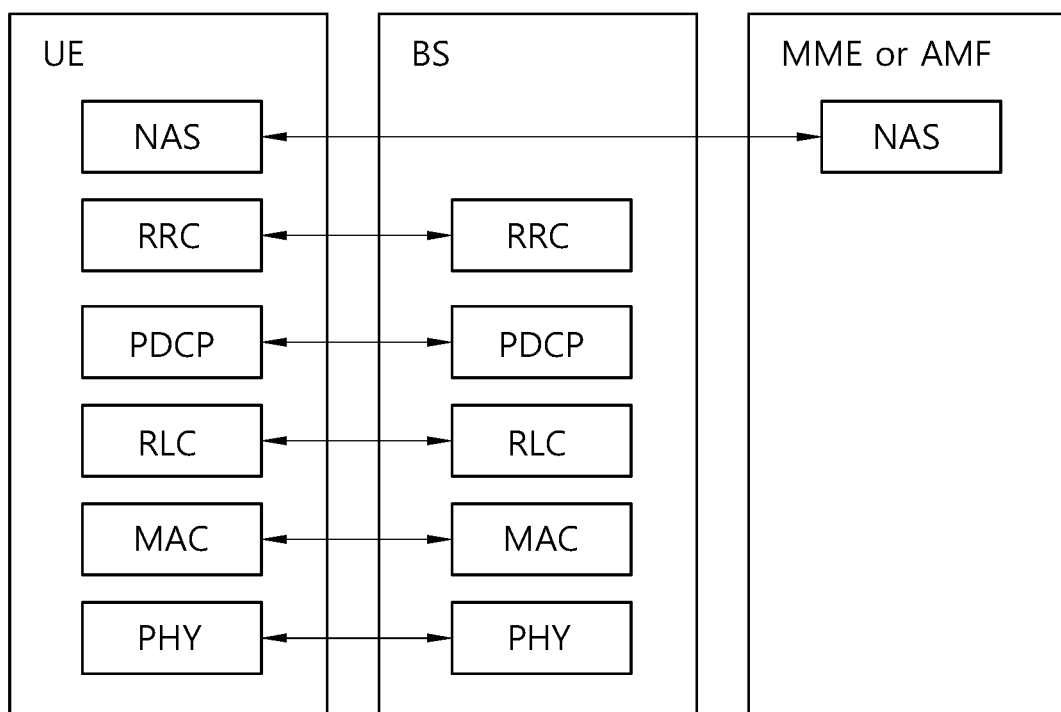

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
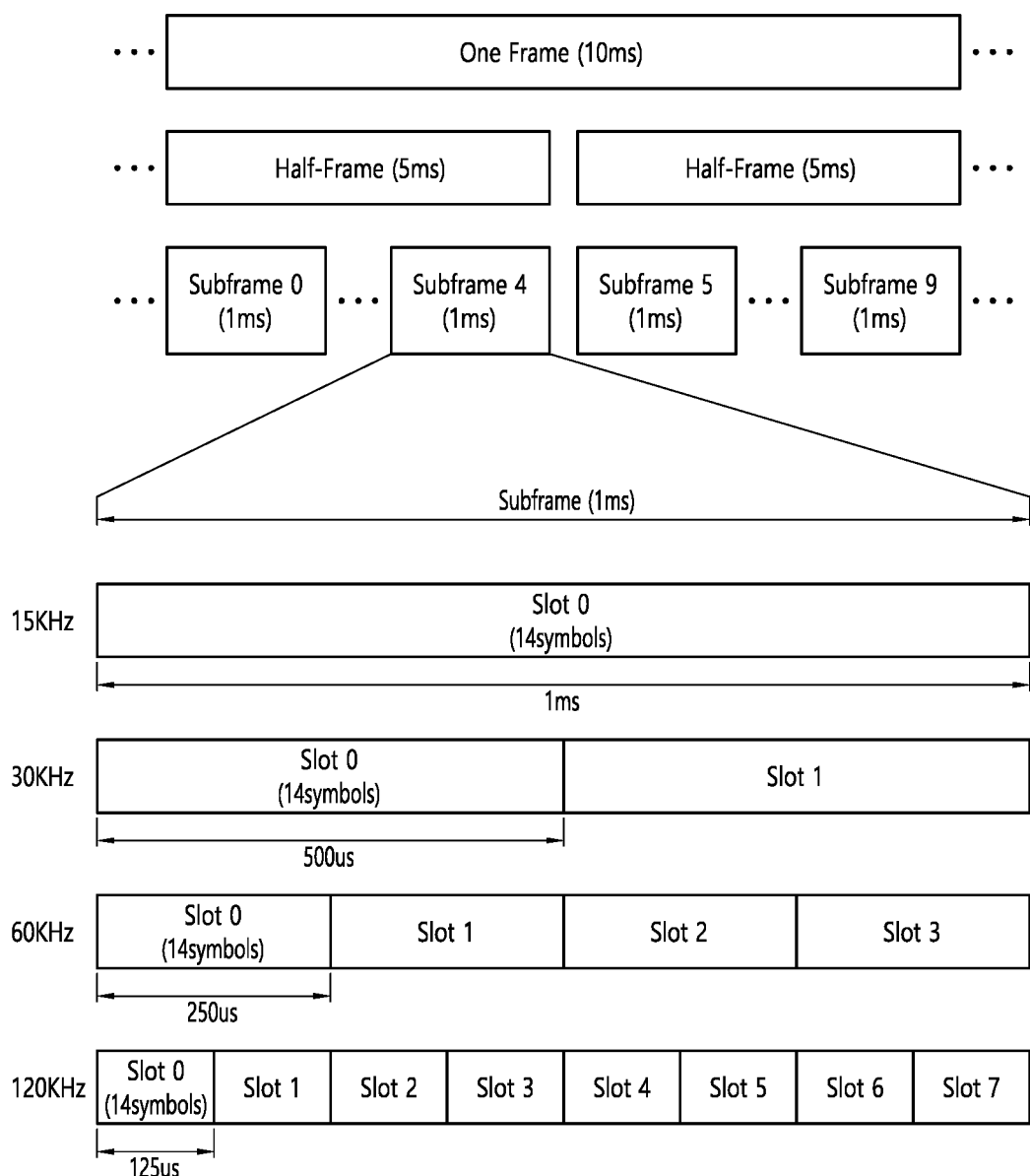
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
| --- | --- | --- | --- |
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{Bwp,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size,u}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
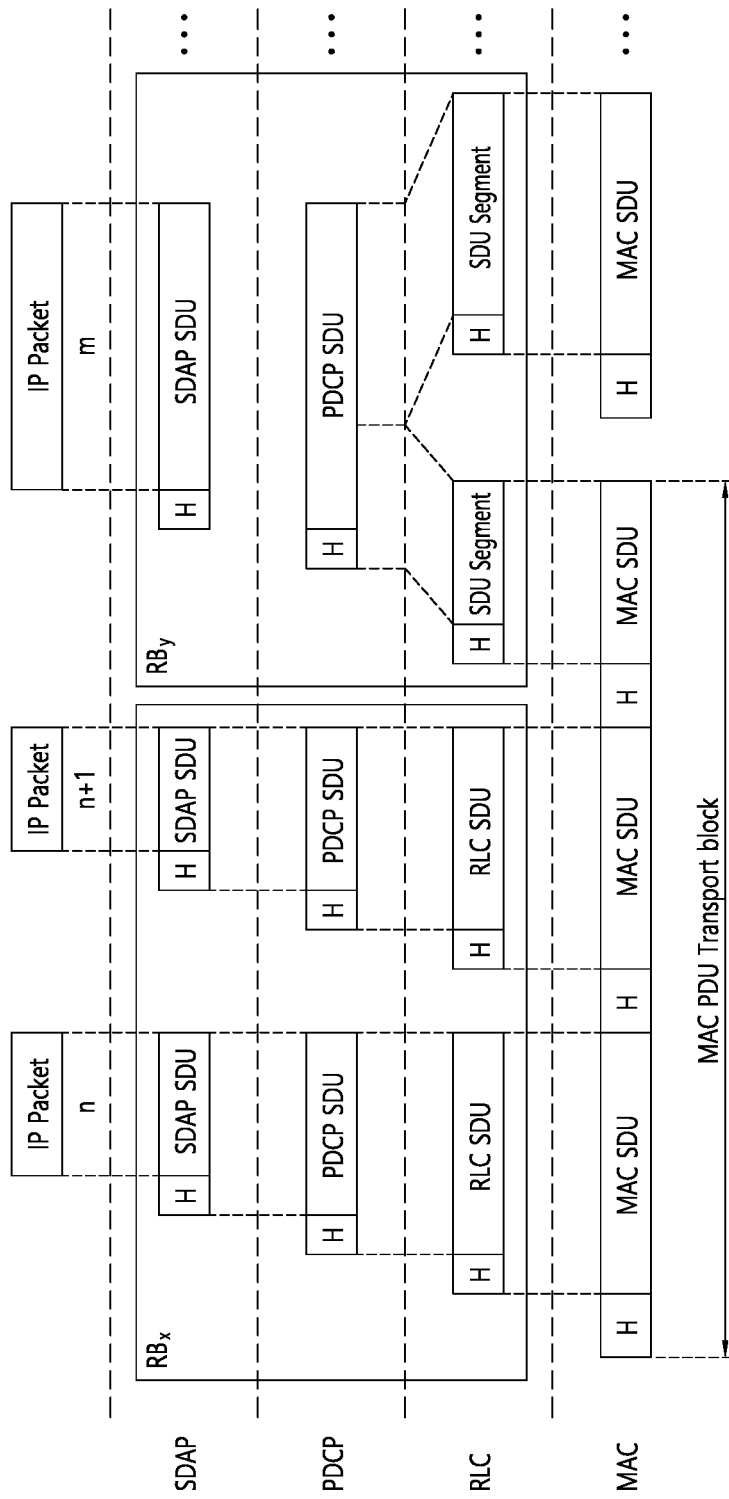
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, technical features related to paging are described. Section 9.2.5 of 3GPP TS 38.300 v16.4.0 may be referred.

Paging allows the network to reach UEs in RRC_IDLE and in RRC_INACTIVE state through Paging messages, and to notify UEs in RRC_IDLE, RRC_INACTIVE and RRC_CONNECTED state of system information change and ETWS/CMAS indications through Short Messages. Both Paging messages and Short Messages are addressed with P-RNTI on PDCCH, but while the former is sent on PCCH, the latter is sent over PDCCH directly.

While in RRC_IDLE the UE monitors the paging channels for CN-initiated paging; in RRC_INACTIVE the UE also monitors paging channels for RAN-initiated paging. A UE need not monitor paging channels continuously though; Paging DRX is defined where the UE in RRC_IDLE or RRC_INACTIVE is only required to monitor paging channels during one Paging Occasion (PO) per DRX cycle. The Paging DRX cycles are configured by the network:

1) For CN-initiated paging, a default cycle is broadcast in system information;
2) For CN-initiated paging, a UE specific cycle can be configured via NAS signalling;
3) For RAN-initiated paging, a UE-specific cycle is configured via RRC signalling;

The UE uses the shortest of the DRX cycles applicable i.e.
 a UE in RRC_IDLE uses the shortest of the first two cycles above, while a UE in RRC_INACTIVE uses the shortest of the three.

The POs of a UE for CN-initiated and RAN-initiated paging are based on the same UE ID, resulting in overlapping POs for both. The number of different POs in a DRX cycle is configurable via system information and a network may distribute UEs to those POs based on their IDs.

When in RRC_CONNECTED, the UE monitors the paging channels in any PO signalled in system information for SI change indication and PWS notification. In case of BA, a UE in RRC_CONNECTED only monitors paging channels on the active BWP with common search space configured.

For operation with shared spectrum channel access, a UE can be configured for an additional number of PDCCH monitoring occasions in its PO to monitor for paging. However, when the UE detects a PDCCH transmission within the UE's PO addressed with P-RNTI, the UE is not required to monitor the subsequent PDCCH monitoring occasions within this PO.

Paging optimization for UEs in CM_IDLE: at UE context release, the NG-RAN node may provide the AMF with a list of recommended cells and NG-RAN nodes as assistance info for subsequent paging. The AMF may also provide Paging Attempt Information consisting of a Paging Attempt Count and the Intended Number of Paging Attempts and may include the Next Paging Area Scope. If Paging Attempt Information is included in the Paging message, each paged NG-RAN node receives the same information during a paging attempt. The Paging Attempt Count shall be increased by one at each new paging attempt. The Next Paging Area Scope, when present, indicates whether the AMF plans to modify the paging area currently selected at next paging attempt. If the UE has changed its state to CM CONNECTED the Paging Attempt Count is reset.

Paging optimization for UEs in RRC_INACTIVE: at RAN Paging, the serving NG-RAN node provides RAN Paging area information. The serving NG-RAN node may also provide RAN Paging attempt information. Each paged NG-RAN node receives the same RAN Paging attempt information during a paging attempt with the following content: Paging Attempt Count, the intended number of paging attempts and the Next Paging Area Scope. The Paging Attempt Count shall be increased by one at each new paging attempt. The Next Paging Area Scope, when present, indicates whether the serving NG RAN node plans to modify the RAN Paging Area currently selected at next paging attempt. If the UE leaves RRC_INACTIVE state the Paging Attempt Count is reset.

Hereinafter, technical features related to network slicing are described. Section 16.3 of 3GPP TS 38.300 v16.4.0 may be referred.

General Principles and Requirements

In this clause, the general principles and requirements related to the realization of network slicing in the NG-RAN for NR connected to 5GC and for E-UTRA connected to 5GC are given.

A network slice always consists of a RAN part and a CN part. The support of network slicing relies on the principle that traffic for different slices is handled by different PDU sessions. Network can realise the different network slices by scheduling and also by providing different L1/L2 configurations.

Each network slice is uniquely identified by an S-NSSAI. NSSAI (Network Slice Selection Assistance Information) includes one or a list of S-NSSAIs (Single NSSAI) where an S-NSSAI is a combination of:

mandatory SST (Slice/Service Type) field, which identifies the slice type and consists of 8 bits (with range is 0-255);

optional SD (Slice Differentiator) field, which differentiates among Slices with same SST field and consist of 24 bits.

The list includes at most 8 S-NSSAI(s).

The UE provides NSSAI (Network Slice Selection Assistance Information) for network slice selection in RRCSetupComplete, if it has been provided by NAS. While the network can support large number of slices (hundreds), the UE need not support more than 8 slices simultaneously. A BL UE or a NB-IoT UE supports a maximum of 8 slices simultaneously.

Network Slicing is a concept to allow differentiated treatment depending on each customer requirements. With slicing, it is possible for Mobile Network Operators (MNO) to consider customers as belonging to different tenant types with each having different service requirements that govern in terms of what slice types each tenant is eligible to use based on Service Level Agreement (SLA) and subscriptions.

The following key principles apply for support of Network Slicing in NG-RAN:

RAN awareness of slices

NG-RAN supports a differentiated handling of traffic for different network slices which have been pre-configured. How NG-RAN supports the slice enabling in terms of NG-RAN functions (i.e. the set of network functions that comprise each slice) is implementation dependent.

Selection of RAN part of the network slice

NG-RAN supports the selection of the RAN part of the network slice, by NSSAI provided by the UE or the 5GC which unambiguously identifies one or more of the pre-configured network slices in the PLMN.

Resource management between slices

NG-RAN supports policy enforcement between slices as per service level agreements. It should be possible for a single NG-RAN node to support multiple slices. The NG-RAN should be free to apply the best RRM policy for the SLA in place to each supported slice.

Support of QoS

NG-RAN supports QoS differentiation within a slice.

RAN selection of CN entity
For initial attach, the UE may provide NSSAI to support the selection of an AMF. If available, NG-RAN uses this information for routing the initial NAS to an AMF. If the NG-RAN is unable to select an AMF using this information or the UE does not provide any such information the NG-RAN sends the NAS signalling to one of the default AMFs.
For subsequent accesses, the UE provides a Temp ID, which is assigned to the UE by the 5GC, to enable the NG-RAN to route the NAS message to the appropriate AMF as long as the Temp ID is valid (NG-RAN is aware of and can reach the AMF which is associated with the Temp ID). Otherwise, the methods for initial attach applies.

Resource isolation between slices
The NG-RAN supports resource isolation between slices. NG-RAN resource isolation may be achieved by means of RRM policies and protection mechanisms that should avoid that shortage of shared resources in one slice breaks the service level agreement for another slice. It should be possible to fully dedicate NG-RAN resources to a certain slice. How NG-RAN supports resource isolation is implementation dependent.

Access control
By means of the unified access control, operator-defined access categories can be used to enable differentiated handling for different slices. NG-RAN may broadcast barring control information (i.e. a list of barring parameters associated with operator-defined access categories) to minimize the impact of congested slices.

Slice Availability
Some slices may be available only in part of the network. The NG-RAN supported S-NSSAI(s) is configured by OAM. Awareness in the NG-RAN of the slices supported in the cells of its neighbours may be beneficial for inter-frequency mobility in connected mode. It is assumed that the slice availability does not change within the UE's registration area.
The NG-RAN and the 5GC are responsible to handle a service request for a slice that may or may not be available in a given area. Admission or rejection of access to a slice may depend by factors such as support for the slice, availability of resources, support of the requested service by NG-RAN.

Support for UE associating with multiple network slices simultaneously
In case a UE is associated with multiple slices simultaneously, only one signalling connection is maintained and for intra-frequency cell reselection, the UE always tries to camp on the best cell. For inter-frequency cell reselection, dedicated priorities can be used to control the frequency on which the UE camps.

Granularity of slice awareness
Slice awareness in NG-RAN is introduced at PDU session level, by indicating the S-NSSAI corresponding to the PDU Session, in all signalling containing PDU session resource information.

Validation of the UE rights to access a network slice
It is the responsibility of the 5GC to validate that the UE has the rights to access a network slice. Prior to receiving the Initial Context Setup Request message, the NG-RAN may be allowed to apply some provisional/local policies, based on awareness of which slice the UE is requesting access to. During the initial context setup, the NG-RAN is informed of the slice for which resources are being requested.

AMF and NW Slice Selection

CN-RAN interaction and internal RAN aspects
NG-RAN selects AMF based on a Temp ID or NSSAI provided by the UE over RRC. The mechanisms used in the RRC protocol are described in the next clause.
Table 5 shows an example of AMF selection based on Temp ID and NSSAI.

TABLE 5

| Temp ID | NSSAI | AMF Selection by NG-RAN |
|---|---|---|
| not available or invalid | not available | One of the default AMFs is selected (NOTE) |
| not available or invalid | present | Selects AMF which supports UE requested slices |
| valid | not available, or present | Selects AMF per CN identity information in Temp ID |

The set of default AMFs is configured in the NG-RAN nodes via OAM.

Radio Interface Aspects
When triggered by the upper layer, the UE conveys the NSSAI over RRC in the format explicitly indicated by the upper layer.

Resource Isolation and Management
Resource isolation enables specialized customization and avoids one slice affecting another slice.
Hardware/software resource isolation is up to implementation. Each slice may be assigned with either shared or dedicated radio resource up to RRM implementation and SLA.
To enable differentiated handling of traffic for network slices with different SLA:
  NG-RAN is configured with a set of different configurations for different network slices by OAM;
  To select the appropriate configuration for the traffic for each network slice, NG-RAN receives relevant information indicating which of the configurations applies for this specific network slice.

Figure 10:
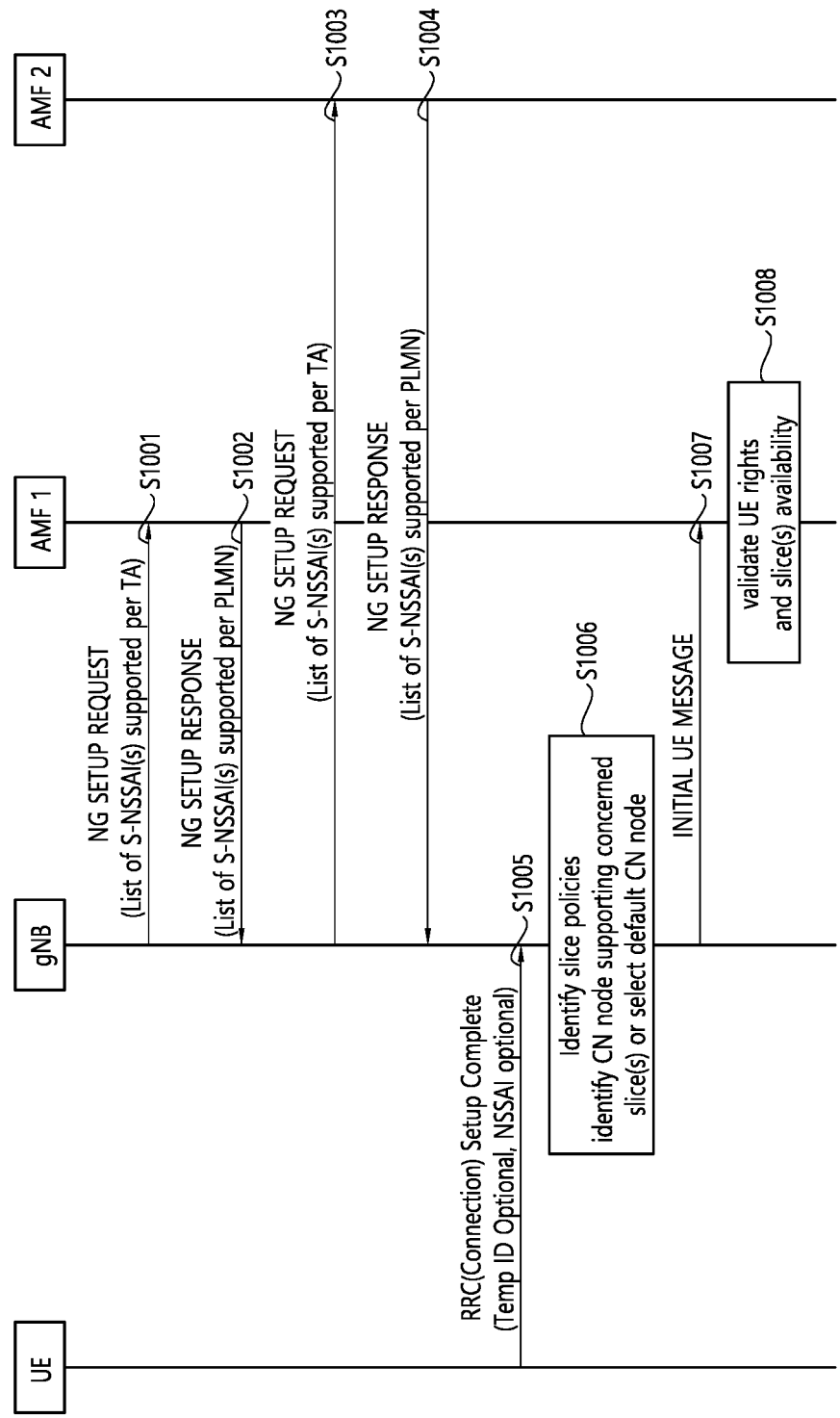
FIG. 10 shows an example of AMF selection to which implementations of the present disclosure is applied.

AMF and NW Slice Selection
RAN selects the AMF based on a Temp ID or NSSAI provided by the UE.
FIG. 10 shows an example of AMF selection to which implementations of the present disclosure is applied.
In case a Temp ID is not available, the NG-RAN uses the NSSAI provided by the UE at RRC connection establishment to select the appropriate AMF (the information is provided after MSG3 of the random access procedure). If such information is also not available, the NG-RAN routes the UE to one of the configured default AMF(s).
The NG-RAN uses the list of supported S-NSSAI(s) previously received in the NG Setup Response message when selecting the AMF with the NSSAI. This list may be updated via the AMF Configuration Update message.
In step S1001, gNB may transmit, to AMF1, an NG SETUP REQUEST message including list of S-NSSAI(s) supported per TA.

In step S1002, gNB may receive, from AMF1 and AMF2, an NG SETUP REQUEST including list of S-NSSAI(s) supported per PLMN.

In step S1003, gNB may transmit, to AMF2, an NG SETUP REQUEST message including list of S-NSSAI(s) supported per TA.

In step S1004, gNB may receive, from AMF2, an NG SETUP REQUEST including list of S-NSSAI(s) supported per PLMN.

In step S1005, gNB may receive, from UE, an RRC (Connection) Setup Complete message including Temp ID (optional) and NSSAI (optional).

In step S1006, gNB may identify slice policies, identify CN node supporting concerned slice(s), or select default CN node.

In step S1007, gNB may transmit, to AMF1, an INITIAL UE message.

In step S1008, gNB may validate UE rights and slice(s) availability.

UE Context Handling is described

Figure 11:
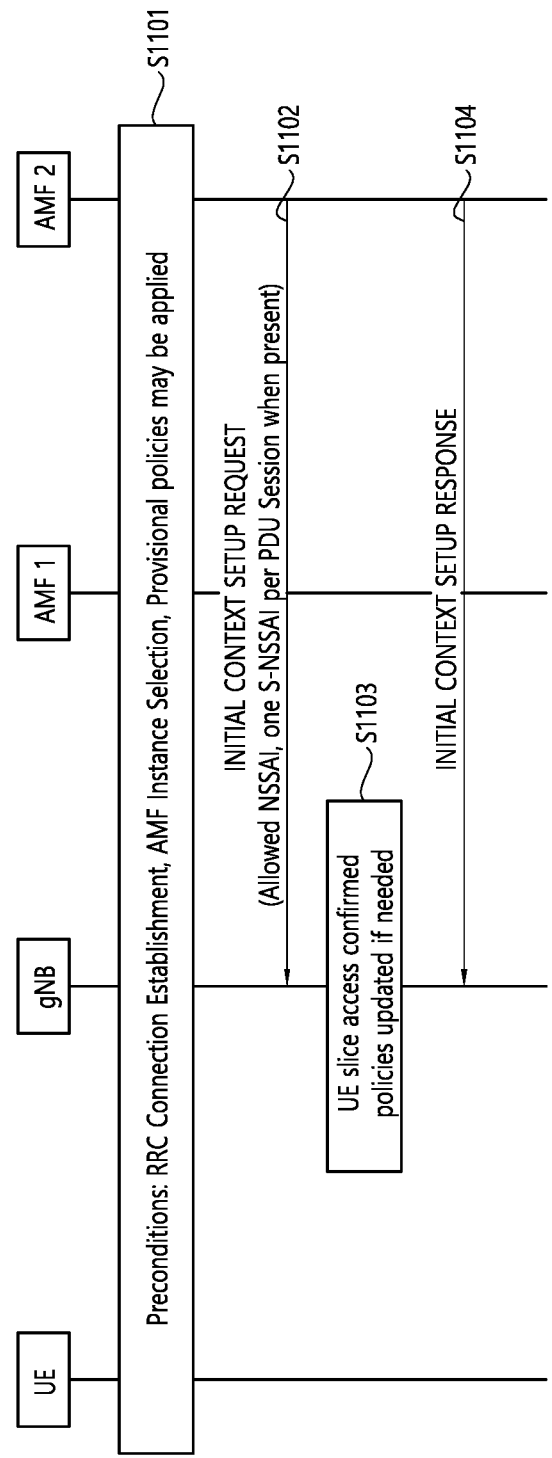
FIG. 11 shows an example of Network Slice-aware Initial Context Setup to which implementations of the present disclosure is applied.

FIG. 11 shows an example of Network Slice-aware Initial Context Setup to which implementations of the present disclosure is applied.

Following the initial access, the establishment of the RRC connection and the selection of the correct AMF, the AMF establishes the complete UE context by sending the Initial Context Setup Request message to the NG-RAN over NG-C. The message contains the Allowed NSSAI and additionally contains the S-NSSAI(s) as part of the PDU session(s) resource description when present in the message. Upon successful establishment of the UE context and allocation of PDU session resources to the relevant network slice(s) when present, the NG-RAN responds with the Initial Context Setup Response message.

In step S1101, as preconditions, RRC Connection establishment, AMF Instance selection, Provisional policies may be applied.

In step S1102, AMF2 (or AMF1) may transmit, to gNB, an initial context setup request message including allowed NSSAI and/or one S-NSSAI per PDU session when present.

In step S1103, in gNB, UE slice access may be confirmed, and policies may be updated if needed.

In step S1104, gNB may transmit, to the AMF2 (or AMF1), an initial context setup response message.

Figure 12:
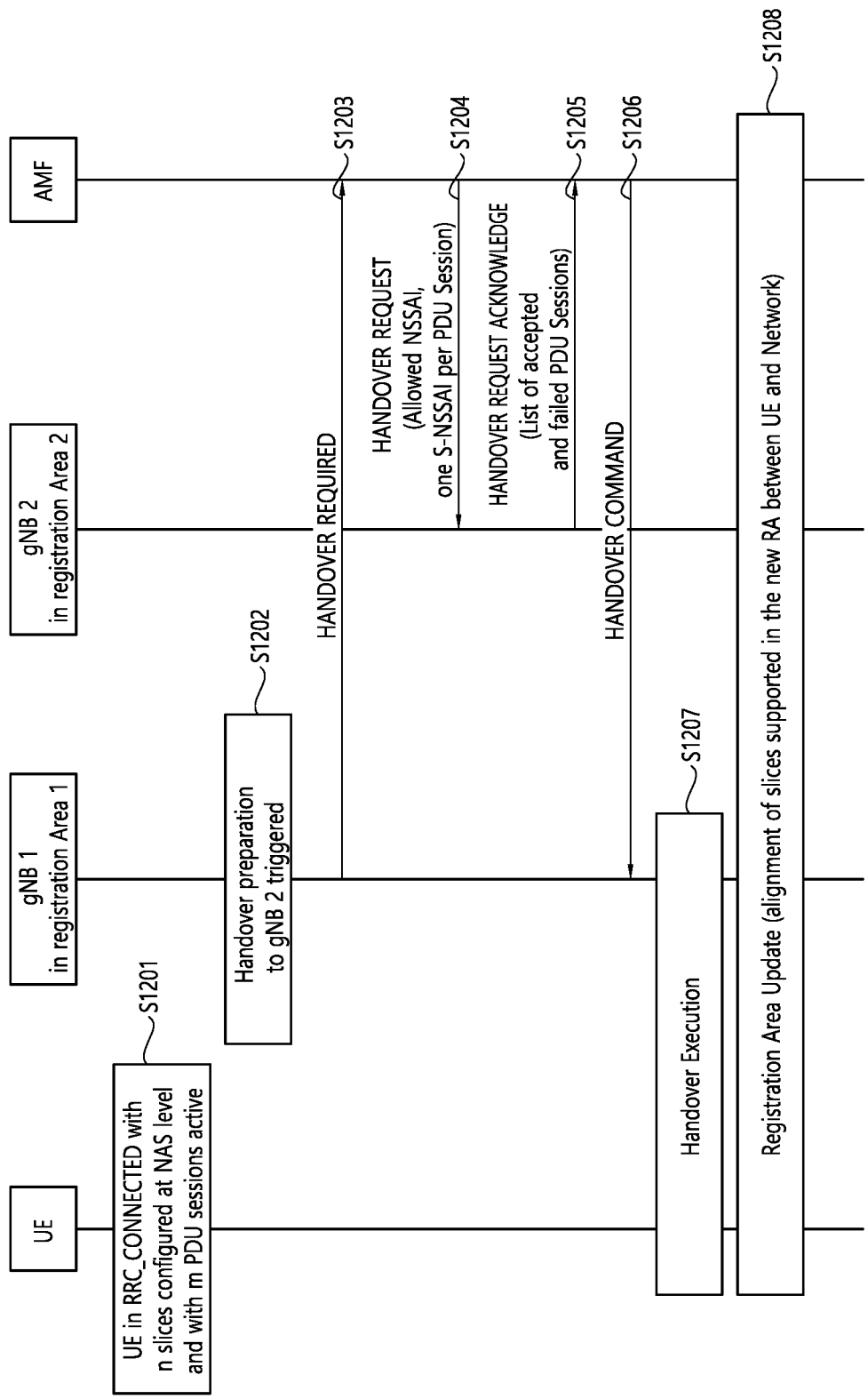
FIGS. 12 and 13 show examples of mobility to which implementations of the present disclosure is applied.
Figure 13:
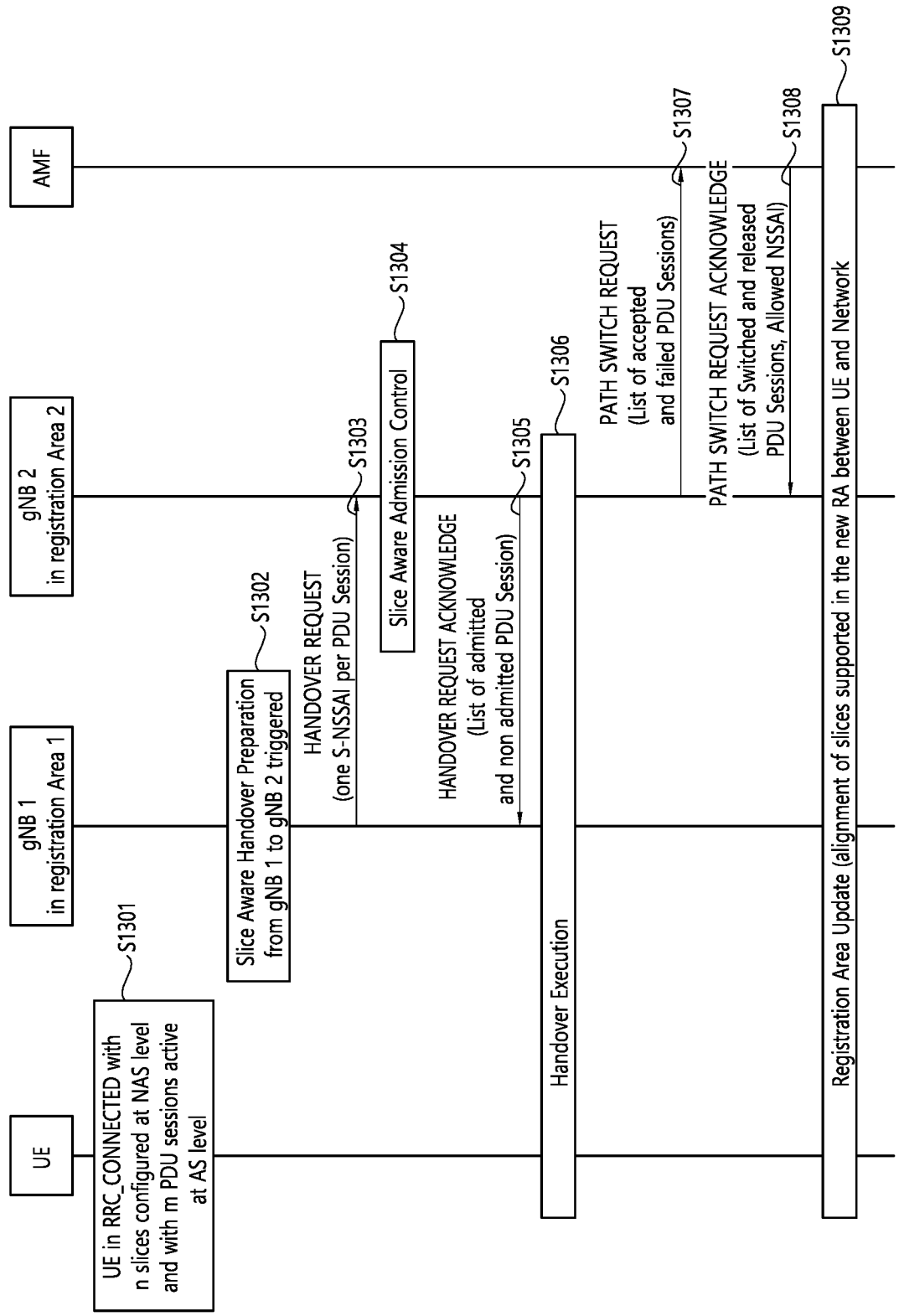

FIGS. 12 and 13 show examples of mobility to which implementations of the present disclosure is applied.

To make mobility slice-aware in case of Network Slicing, S-NSSAI is introduced as part of the PDU session information that is transferred during mobility signalling. This enables slice-aware admission and congestion control.

Both NG and Xn handovers are allowed regardless of the slice support of the target NG-RAN node i.e. even if the target NG-RAN node does not support the same slices as the source NG-RAN node. An example for the case of connected mode mobility across different Registration Areas is shown in FIG. 12 for the case of NG based handover and in FIG. 13 for the case of Xn based handover.

In particular, FIG. 12 illustrates an example of NG based mobility across different Registration Areas.

In step S1201, UE may be in RRC_Connected with n slices configured at NAS level and with m PDU session active.

In step S1202, gNB1, in Registration Area 1, may trigger handover preparation to gNB2 which is in Registration Area 2.

In step S1203, gNB1 may transmit, to AMF, a handover required message.

In step S1204, AMF may transmit, to gNB2, a handover request message including allowed NSSAI and/or one S-NSSAI per PDU session.

In step S1205, gNB2 may transmit, to AMF, a handover request acknowledge message including a list of accepted and failed PDU sessions.

In step S1206, AMF may transmit, to gNB1, a handover command.

In step S1207, the UE may perform handover from gNB1 to gNB2.

In step S1208, the registration area update (alignment of slices supported in the new RA between UE and network) may be performed.

In particular, FIG. 13 illustrates an example of Xn based mobility across different Registration Areas.

In step S1301, UE may be in RRC_Connected with n slices configured at NAS level and with m PDU session active at AS level.

In step S1302, gNB1, in Registration Area 1, may trigger slice aware handover preparation from gNB1 to gNB2, which is in Registration Area 2.

In step S1303, gNB1 may transmit, to gNB2, a handover request message including one S-NSSAI per PDU session.

In step S1304, gNB2 may perform slice aware admission control.

In step S1305, gNB2 may transmit, to gNB1, a handover request acknowledge message including a list of admitted and nod admitted PDU sessions.

In step S1306, UE may perform handover from gNB1 to gNB2.

In step S1307, gNB2 may transmit, to AMF, a path switch request message including a list of accepted and failed PDU sessions.

In step S1308, AMF may transmit, to gNB2, a path switch request acknowledge message including a list of switched and released PDU sessions and/or allowed NSSAI.

In step S1309, the registration area update (alignment of slices supported in the new RA between UE and network) may be performed.

Hereinafter, technical features related to paging are described. Section 5.3.2 of 3GPP TS 38.331 v16.3.1 may be referred.

The purpose of this procedure is:
to transmit paging information to a UE in RRC_IDLE or RRC_INACTIVE.

Initiation

The network initiates the paging procedure by transmitting the Paging message at the UE's paging occasion. The network may address multiple UEs within a Paging message by including one PagingRecord for each UE.

Reception of the Paging message by the UE

Upon receiving the Paging message, the UE shall:
1> if in RRC_IDLE, for each of the PagingRecord, if any, included in the Paging message:
2> if the ue-Identity included in the PagingRecord matches the UE identity allocated by upper layers:
3> forward the ue-Identity and accessType (if present) to the upper layers;
1> if in RRC_INACTIVE, for each of the PagingRecord, if any, included in the Paging message:
2> if the ue-Identity included in the PagingRecord matches the UE's stored fullI-RNTI:
3> if the UE is configured by upper layers with Access Identity 1:
4> initiate the RRC connection resumption procedure with resumeCause set to mps-PriorityAccess;

3> else if the UE is configured by upper layers with Access Identity 2:
   4> initiate the RRC connection resumption procedure with resumeCause set to mcs-PriorityAccess;
3> else if the UE is configured by upper layers with one or more Access Identities equal to 11-15:
   4> initiate the RRC connection resumption procedure with resumeCause set to highPriorityAccess;
3> else:
   4> initiate the RRC connection resumption procedure with resumeCause set to mt-Access;
2> else if the ue-Identity included in the PagingRecord matches the UE identity allocated by upper layers:
   3> forward the ue-Identity to upper layers and accessType (if present) to the upper layers;
   3> perform the actions upon going to RRC_IDLE with release cause 'other'.

The Paging message is used for the notification of one or more UEs.

Signalling radio bearer: N/A
RLC-SAP: TM
Logical channel: PCCH
Direction: Network to UE Table 6 shows an example of a contents included in a paging message.

system information modification, public warning message indication, or DL data arrival. Upon reception of a paging message, the UE does not know for what the network triggers the paging procedure. So, of course, the UE does not know whether the serving cell supports the network slice assigned to the service for DL data.

Therefore, paging enhancement by including S-NSSAI for DL data in a paging message has been discussed.

Figure 14:
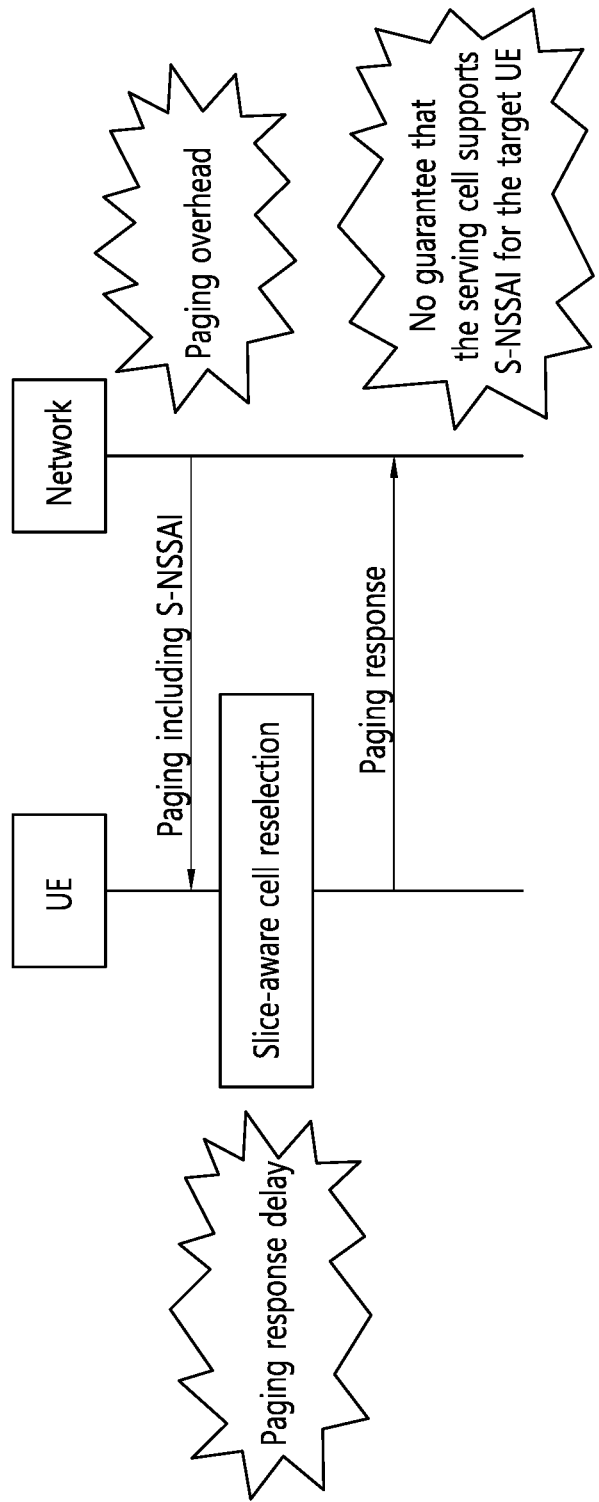
FIG. 14 shows an example of paging enhancement by including S-NSSAI in a paging message.

FIG. 14 shows an example of paging enhancement by including S-NSSAI in a paging message.

The network may transmit a paging message indicating S-NSSAI for DL data, and the UE may perform a cell reselection procedure if the serving cell does not support the S-NSSAI. This paging enhancement, however, has some problems.

The first problem is paging overhead. A paging message can include maximum 32 paging entries. If 32 paging entries have S-NSSAIs, the size of a legacy paging message is increased by maximum 1,024 bits, and the paging messages are broadcast in a whole paging area.

The second problem is increased paging response delay. If the serving cell does not support the S-NSSAI within the paging message, the UE needs to perform cell reselection before sending the paging response to the network, and the

TABLE 6

```
-- ASN1START
-- TAG-PAGING-START
Paging ::=                  SEQUENCE {
   pagingRecordList             PagingRecordList
OPTIONAL, -- Need N
   lateNonCriticalExtension        OCTET STRING
OPTIONAL,
   nonCriticalExtension            SEQUENCE { }
OPTIONAL
}
PagingRecordList ::=        SEQUENCE {SIZE(1..maxNrofPageRec)}
OF PagingRecord
PagingRecord ::=            SEQUENCE {
   ue-Identity                  PagingUE-Identity,
   accessType                   ENUMERATED {non3GPP}   OPTIONAL,
-- Need N
   ...
}
PagingUE-Identity ::=       CHOICE {
   ng-5G-S-TMSI                 NG-5C-S-TMSI,
   fullI-RNTI                   I-RNTI-Value,
   ...
}
-- TAG-PAGING-STOP
-- AST1STOP
```

In Table 6, accessType may indicate whether the Paging message is originated due to the PDU sessions from the non-3GPP access.

Meanwhile, where the network resources are configured for network slices, to provide a service, the UE should be in a cell supporting the network slice assigned to the service. If the UE is not in a cell supporting the network slice, the UE needs to move to another cell supporting the network slice. For slice-aware mobility, the UE may perform slice-aware cell selection/cell reselection, or the network may request slice-aware handover/redirection to the UE.

If the UE is in a cell that does not provide the necessary network slice, when MT service occurs, UE can move to a cell providing a service with a handover request received from the network through NAS signaling, after transitioning to the connected mode.

Paging allows the network to reach UEs in RRC_IDLE and in RRC_INACTIVE state through a paging message for increased paging response time may cause paging repetitions or paging failures on the network side.

The third problem, the network still may not know immediately whether the serving cell supports the S-NSSAI for the target UE because, if the UE moves to another area, the slice configuration for a particular service could be changed. To verify whether a cell supports a network slice assigned to a particular service for the UE, the RAN node may need to retrieve the UE context from another RAN node or the CN, which takes some time.

As these problems are not trivial, further paging enhancement should be considered.

Therefore, studies for a paging procedure considering network slicing in a wireless communication system are required.

Hereinafter, a method for paging procedure considering network slicing in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 15:
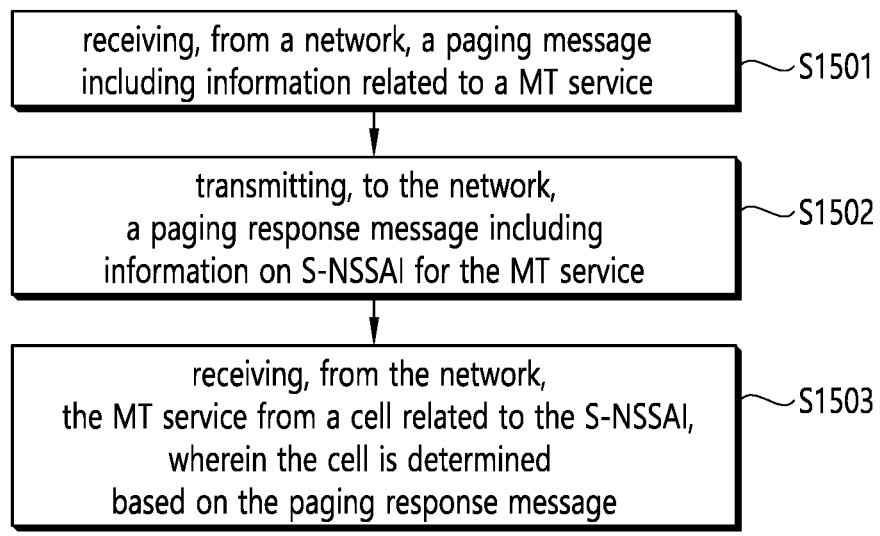
FIG. 15 shows an example of a method for paging procedure considering network slicing in a wireless communication system.

FIG. 15 shows an example of a method for paging procedure considering network slicing in a wireless communication system.

In particular, FIG. 15 shows an example of a method performed by a wireless device in a wireless communication system.

In step S1501, a wireless device may receive, from a network, a paging message including information related to a mobile terminated (MT) service.

For example, the MT service may include at least one of a massive Internet of Things (mIoT) service, an enhanced Mobile Broadband (eMBB) service, an Ultra-Reliable and Low Latency Communications (URLLC) service, a Vehicle-to-Everything (V2X) service, an Internet service, and/or an Internet Protocol (IP) Multimedia Subsystem (IMS) service.

For example, the information related to the MT service may include at least one of (1) information on a Slice/Service Type related to a network slice assigned for the MT service, (2) information on a Single-Network Slice Selection Assistance Information (S-NSSAI) related to a network slice assigned for the MT service, (3) information on a service type of the MT service, and/or (4) information on a group identity of network slices assigned for the MT service.

In step S1502, a wireless device may transmit, to the network, a paging response message including information on Single-Network Slice Selection Assistance Information (S-NSSAI) for the MT service.

For example, the paging response message may include a group ID for network slices assigned for the MT service.

For example, upon receiving the paging, the wireless device may determine whether a serving cell supports a network slice assigned for the MT service based on the information related to the MT service. Based on determining that the serving cell does not support the network slice assigned for the MT service, the wireless device may include an indication, informing that the network slice assigned for the MT service is not supported by the serving cell, in the paging response message.

For example, when the wireless device is in RRC_INACTIVE, the paging response message may be an RRC resume request message.

For example, when the wireless device is in RRC_IDLE, and the paging response message may be an RRC setup request message or a service request message.

According to some embodiments of the present disclosure, the information related to the MT service, included in the paging, may include a specific Slice/Service Type (SST) (or a network slice identity) related to a network slice assigned for the MT service.

Upon receiving the paging, the wireless device may check whether the specific SST is matched with a Configured S-NSSAI and/or an Allowed S-NSSAI stored in the wireless device.

For example, based on determining that the specific SST is matched with a certain Configured S-NSSAI, and the certain Configured S-NSSAI is not allowed in a serving cell, the wireless device may include information on the certain Configured S-NSSAI in the paging response message.

For example, based on determining that the specific SST is matched with a certain Allowed S-NSSAIs of a serving cell, the wireless device may include an indication informing that the serving cell supports the network slice assigned for the MT service in the paging response message.

According to some embodiments of the present disclosure, the wireless device may receive a configuration for dual connectivity or carrier aggregation. The wireless device may configure the dual connectivity and carrier aggregation. That is, the wireless device may receive a configuration for master cell group (MCG) and/or secondary cell group (SCG).

For example, when the wireless device receives the paging including the information related to the MT service, the wireless device may check whether secondary cells (SCells) of MCG and/or SCG support a network slice for the MT service. Based on that a specific cell among the SCells supports the network slice for the MT service, the wireless device may include a cell identity of the specific cell in the paging response message.

In step S1503, a wireless device may receive, from the network, the MT service from a cell related to the S-NSSAI.

The cell may be determined based on the paging response message.

For example, the wireless device may perform mobility to the cell which supports the network slice assigned for the MT service. For example, the wireless device may receive a mobility message, from the network, informing it to move to the cell which supports the network slice assigned for the MT service. That is, when the wireless device receives the mobility message, the wireless device may perform handover to the cell supporting the network slice assigned for the MT service.

For another example, the wireless device may receive the MT service via the serving cell based on that the serving cell supports the network slice assigned for the MT service.

According to some embodiments of the present disclosure, the wireless device may be in communication with at least one of a user equipment, a network, or an autonomous vehicle other than the wireless device.

Figure 16:
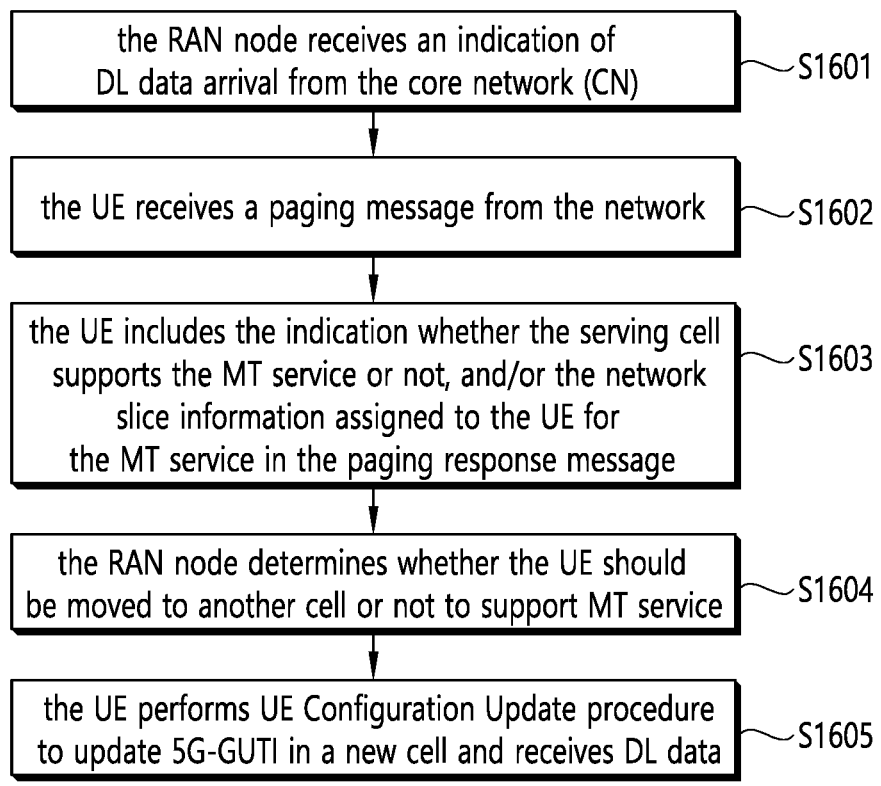
FIG. 16 shows an example of the slice aware paging procedure in a wireless communication system.

FIG. 16 shows an example of the slice aware paging procedure in a wireless communication system.

To implement a slice-aware paging procedure, the present disclosure proposes that the UE transmits a network slice information in a paging response message to the network, while the network includes DL data information in a paging message. The network slice information in a paging response message may be S-NSSAI among Allowed or Configured S-NSSAIs, an (group) identity of a network slice(s) specified by the network (for example, RAN).

According to implementations of the present disclosure,
  the term MT service may be used to identify the service
    that DL data triggering paging is associated with. For
    example, the MT service may be mIOT, eMBB,
    URLLC, V2X, Internet, IMS, etc.
  the network may include MT service information in a
    paging message. The MT service information may be
    Slice/Service Type (SST), S-NSSAI, a network (RAN)
    specific identity of a service type (for example, eMBB,
    URLLC, mMTC), or a group identity of network slices.

Referring to FIG. 16, in step S1601, the RAN node may receive an indication of DL data arrival from the core network (CN).

The RAN node may receive the MT service information
  associated with DL data.

The MT service information may be S-NSSAI or SST used for the MT service.

The MT service information may be an identification of a network slice, or a group identification of network slices maintained by the network such as RAN node or CN.

The MT service information may be an indication of a service such as IMS, V2X, URLLC, eMBB, mIOT, etc.

In step S1602, the UE may receive a paging message from the network.

The UE may receive the MT service information from the network.

The UE may receive an indication of DL data arrival.

In step S1603, upon reception of the paging message transmitted to the UE (if the ue-Identity included in the pagingRecord matches the UE identity allocated by upper layers or the I-RNTI), the UE may include the indication whether the serving cell supports the MT service or not, and/or the network slice information assigned to the UE for the MT service in the paging response message.

If the UE is in RRC_INACTIVE, the paging response message may be RRC resume request. If the UE is in RRC_IDLE, the paging response message may be RRC setup request or Service Request.

If the UE receives SST for MT service in a paging message, the UE may check whether any SST of the configured/allowed S-NSSAIs stored in the UE matches the SST included in a paging message.

If the SST included in a paging message matches the SST of one of Configured S-NSSAIs while the Configured S-NSSAI is not allowed in the serving cell, the UE may include the Configured S-NSSAI in the paging response message.

If the SST included in a paging message matches the SST of one of Allowed S-NSSAIs, the UE may include the indication that the serving cell supports MT service.

If the UE receives S-NSSAI for MT service in a paging message, the UE may check whether the serving cell supports the S-NSSAI or not.

If the serving cell does not support the S-NSSAI and the UE has Configured S-NSSAI whose SST matches the SST of the S-NSSAI included in a paging message, the UE may include the Configured S-NSSAI in the paging response message.

If the serving cell does not support the S-NSSAI, the UE may include the indication that the S-NSSAI is not supported in the cell in a paging response message.

If the UE receives the network slice identity associated with S-NSSAI(s) for MT service in a paging message, the UE may check whether or not the serving cell supports the network slice identity or the associated S-NSSAI.

If the serving cell does not support the network slice identity or the associated S-NSSAI(s), the UE may include the indication that the network slice is not supported in the cell in a paging response message.

If any SST of configured/allowed S-NSSAIs of the UE matches the S-NSSAI associated with the network slice identity, the UE may include the S-NSSAI in the paging response message.

If no MT service information is included in a paging message, the UE may include the intended slice information in a paging response message.

Upon reception of MT service included in a paging message, the UE may check whether SCells of MCG and SCG supports the network slice for the MT service, if configured. If one of the cells support the network slice for MT service, the UE may include the cell identity in the paging response message.

In step S1604, upon reception of a paging response message, the RAN node determines whether the UE should be moved to another cell or not to support MT service.

If the RAN node determines that the UE can provide MT service for DL data, the RAN node proceed DL data forwarding procedure.

If the RAN node determines that the UE cannot provide MT service for DL data, the network (CN or RAN) may instruct mobility commands to the UE.

The UE may receive RRC message (for example, RRC reconfiguration) for handover.

The UE may receive RRC message (for example, RRC release) for redirection or cell reselection parameter update.

The UE may receive NAS message (for example, UE Configuration Update) to receive slice configurations of the registration area where the UE is located.

In step S1605, if the UE moves to another cell supporting MT service, the UE may perform UE Configuration Update procedure to update 5G-GUTI in a new cell. Then, the UE receives DL data.

According to some embodiments of the present disclosure, in a method performed by a wireless device operating in a wireless communication system, the wireless device may receive, from a network, a paging message indicating MT service. The wireless device may transmit, to the network, a paging response message indicating the network slice for the MT service.

Figure 17:
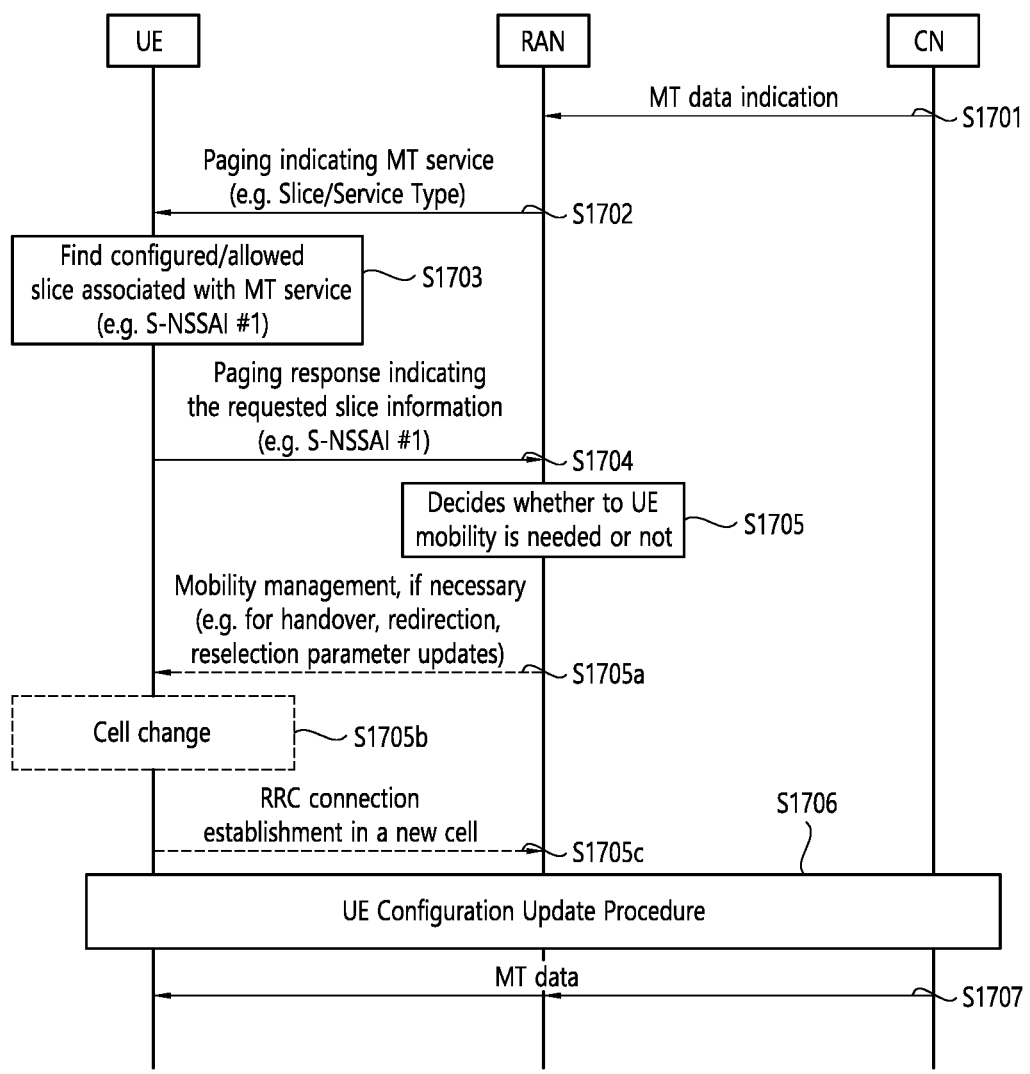
FIGS. 17 and 18 show example scenarios for paging enhancement, according to some embodiments of the present disclosure.
Figure 18:
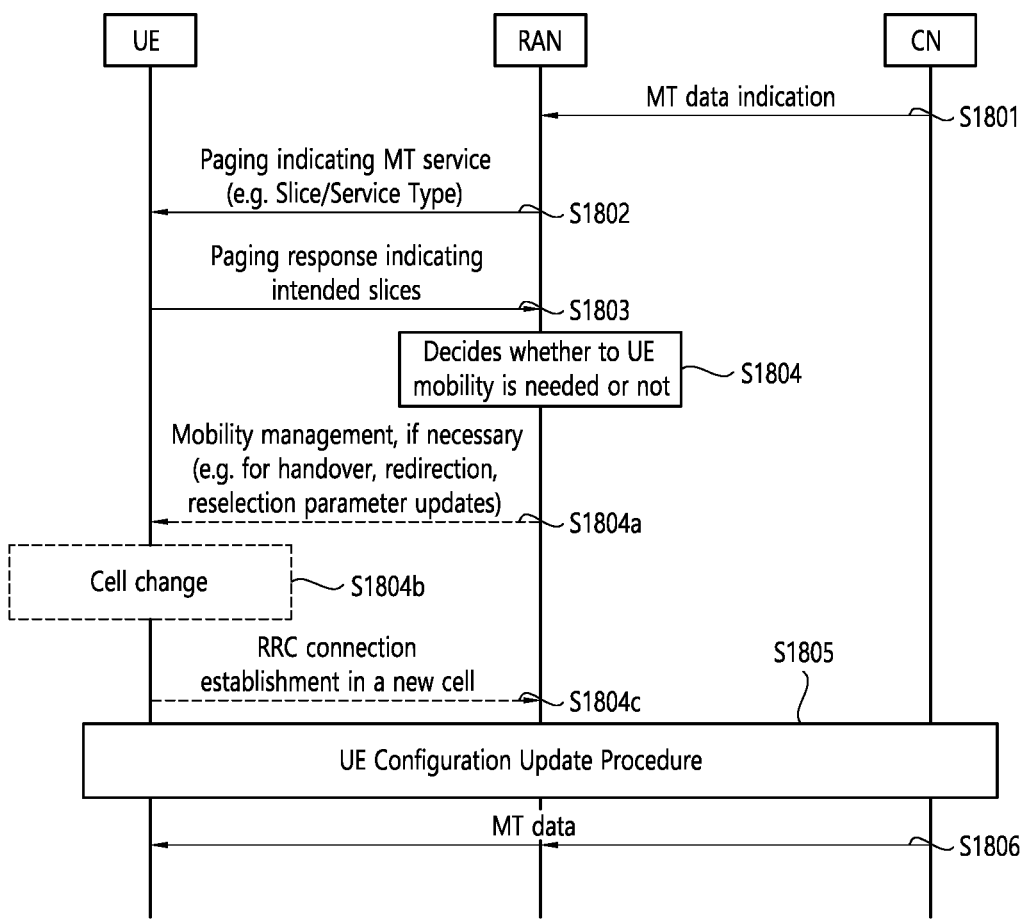

FIGS. 17 and 18 show example scenarios for paging enhancement, according to some embodiments of the present disclosure.

Referring to FIG. 17, in step S1701, the CN may transmit, to the RAN, an MT data indication.

In step S1702, the RAN may transmit, to the UE, a paging indicating the MT service (for example, the paging including a Slice/Service Type (SST)).

In step S1703, the UE may find configured/allowed slice associated with MT service (for example, S-NSSAI #1)

In step S1704, the UE may transmit, to the RAN, a paging response indicating the requested slice information (for example, the paging response including the S-NSSAI #1). For example, the RAN may determine the UE mobility without (or before) performing the UE context retrieve procedure (for example, transmitting and receiving retrieve UE context request and retrieve UE context response between the current gNB and the last serving gNB).

In step S1705, the RAN may decide whether to UE mobility is needed or not.

In step S1705a, the RAN may transmit, to the UE, a mobility management, if necessary (for example, for handover, redirection, reselection parameter updates).

In step S1705b, the UE may perform cell change.

In step S1705c, the UE may transmit, to the RAN, RRC connection establishment in a new cell.

In step S1706, a UE configuration update procedure may be performed.

In step S1707, the UE may receive the MT data from the CN through the RAN.

Referring to FIG. 18, in step S1801, the CN may transmit, to the RAN, a data indication.

In step S1802, the RAN may transmit, to the UE, a paging indicating a cause (for example, a DL data arrival).

In step S1803, the UE may transmit, to the RAN, a paging response indicating the intended slices.

In step S1804, the RAN may decide whether to UE mobility is needed or not. For example, the RAN may determine the UE mobility without (or before) performing the UE context retrieve procedure.

In step S1804a, the RAN may transmit, to the UE, a mobility management, if necessary (for example, for handover, redirection, reselection parameter updates).

In step S1804b, the UE may perform cell change.

In step S1804c, the UE may transmit, to the RAN, RRC connection establishment in a new cell.

In step S1805, a UE configuration update procedure may be performed.

In step S1806, the UE may receive the MT data from the CN through the RAN.

Figure 19:
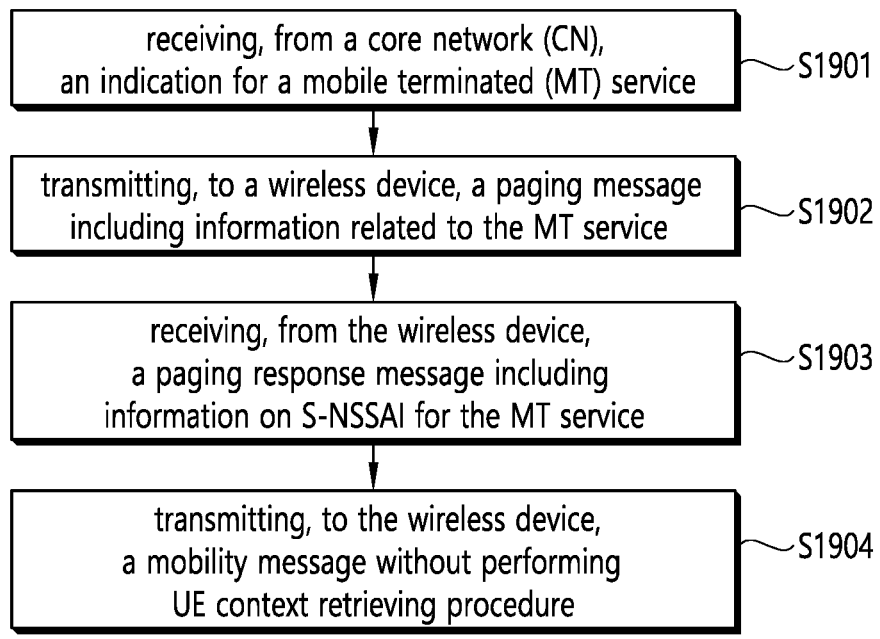
FIG. 19 shows an example of a method performed by a radio access network (RAN) node for slice aware paging procedure, according to some embodiments of the present disclosure.

FIG. 19 shows an example of a method performed by a radio access network (RAN) node for slice aware paging procedure, according to some embodiments of the present disclosure.

In step S1901, a RAN node may receive, from a core network (CN), an indication for a mobile terminated (MT) service.

In step S1902, a RAN node may transmit, to a wireless device, a paging message including information related to the MT service.

For example, the information related to the MT service may include a specific Slice/Service Type (SST) related to a network slice assigned for the MT service.

In step S1903, a RAN node may receive, from the wireless device, a paging response message including information on S-NSSAI for the MT service. For example, the paging response message may be an RRC resume request message, while the wireless device may be in RRC_INACTIVE.

For example, the paging response message may include at least one of (1) whether the indication that the network slice is supported in the serving cell or not, (2) information on a Configured S-NSSAI or an Allowed S-NSSAI configured for the wireless device, and/or (3) information on a cell identity of an SCell which supports the MT service.

In step S1904, a RAN node may transmit, to the wireless device, a mobility message without (or before) performing UE context retrieving procedure. The mobility message may be a handover command to a target cell which supports the network slice assigned for the MT service. For example, the RAN node may determine the target cell based on the information included in the paging response message.

That is, the RAN node may determine to perform a handover for the UE without UE context retrieving procedure.

For example, in the UE context retrieving procedure, the RAN node may transmit, to a last serving RAN node, a retrieve UE context request. In the procedure, The RAN node may receive, from the last serving RAN node, a retrieve UE context response.

For example, the RAN node may perform the UE context retrieving procedure after performing the mobility of the wireless device (for example, RRC resumption).

For example, a UE context may include an eNB UE context or a NG-RAN node UE context.

For example, an eNB UE context is a block of information in an eNB associated to one UE. The block of information contains the necessary information required to maintain the E-UTRAN services towards the active UE. An eNB UE context is established when the transition to active state for a UE is completed or in target eNB after completion of handover resource allocation during handover preparation, in which case at least UE state information, security information, UE capability information and the identities of the UE-associated logical S1-connection shall be included in the eNB UE context. If the UE is enabled to use User Plane CIoT EPS Optimization the UE-associated logical S1-connection may be kept after the UE transitions to ECM_IDLE. For Dual Connectivity an eNB UE context is also established in the SeNB after completion of SeNB Addition Preparation.

For example, an NG-RAN node UE context is a block of information in an NG-RAN node associated to one UE. The block of information contains the necessary information required to maintain the NG-RAN services towards the active UE. An NG-RAN node UE context is established when the transition to RRC CONNECTED for a UE is completed or in the target NG-RAN node after completion of handover resource allocation during handover preparation, in which case at least UE state information, security information, UE capability information and the identities of the UE-associated logical NG-connection shall be included in the NG-RAN node UE context. For Dual Connectivity an NG-RAN node UE context is also established in the S-NG-RAN node after completion of S-NG-RAN node Addition Preparation procedure. If radio bearers are requested to be setup during a UE Context setup or modification procedure, the UE capabilities are signalled to the receiving node as part of the UE context setup or modification procedures.

Hereinafter, an apparatus for paging procedure considering network slicing in a wireless communication system, according to some embodiments of the present disclosure, will be described. Herein, the apparatus may be a wireless device (100 or 200) in FIGS. 2, 3, and 5.

For example, a wireless device may perform methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to receive, from a network, a paging message including information related to a mobile terminated (MT) service. The processor 102 may be configured to control the transceiver 106 to transmit, to the network, a paging response message including information on Single-Network Slice Selection Assistance Information (S-NSSAI) for the MT service. The processor 102 may be configured to control the transceiver 106 to receive, from the network, the MT service from a cell related to the S-NSSAI. The cell may be determined based on the paging response message.

For example, the processor 102 may be configured to check whether secondary cells (SCells) of master cell group (MCG) and/or secondary cell group (SCG) support a network slice for the MT service. Based on that a specific cell among the SCells supports the network slice for the MT service, the processor 102 may be configured to include a cell identity of the specific cell in the paging response message.

For example, the paging response message may include a group ID for network slices assigned for the MT service.

For example, the processor 102 may be configured to determine whether a serving cell supports a network slice assigned for the MT service based on the information related to the MT service. The processor 102 may be configured to include an indication, informing that the network slice assigned for the MT service is not supported by the serving cell, in the paging response message, based on the determination.

For example, the MT service may include at least one of a massive Internet of Things (mIoT) service, an enhanced Mobile Broadband (eMBB) service, an Ultra-Reliable and Low Latency Communications (URLLC) service, a Vehicle-to-Everything (V2X) service, an Internet service, and/or an Internet Protocol (IP) Multimedia Subsystem (IMS) service.

For example, the wireless device may be in RRC_INACTIVE. In this case, the paging response message may be an RRC resume request message.

For example, the wireless device may be in RRC_IDLE. In this case, the paging response message may be an RRC setup request message or a service request message.

According to some embodiments of the present disclosure, the information related to the MT service may include a specific Slice/Service Type (SST) related to a network slice assigned for the MT service. The processor 102 may be configured to check whether the specific SST is matched with a Configured S-NSSAI and/or an Allowed S-NSSAI stored in the wireless device.

For example, based on determining that the specific SST is matched with a certain Configured S-NSSAI, and the certain Configured S-NSSAI is not allowed in a serving cell, the processor 102 may be configured to include information on the certain Configured S-NSSAI in the paging response message.

For example, based on determining that the specific SST is matched with a certain Allowed S-NSSAIs of a serving cell, the processor 102 may be configured to include an indication informing that the serving cell supports the network slice assigned for the MT service in the paging response message.

For example, the information related to the MT service may include at least one of (1) information on an S-NSSAI related to a network slice assigned for the MT service, (2) information on a service type of the MT service, and/or (3) information on a group identity of network slices assigned for the MT service.

According to some embodiments of the present disclosure, the processor 102 may be configured to be in communication with at least one of a user equipment, a network, or an autonomous vehicle other than the wireless device.

Hereinafter, a processor for a wireless device for paging procedure considering network slicing in a wireless communication system, according to some embodiments of the present disclosure, will be described.

The processor may be configured to control the wireless device to receive, from a network, a paging message including information related to a mobile terminated (MT) service. The processor may be configured to control the wireless device to transmit, to the network, a paging response message including information on Single-Network Slice Selection Assistance Information (S-NSSAI) for the MT service. The processor may be configured to control the wireless device to receive, from the network, the MT service from a cell related to the S-NSSAI. The cell may be determined based on the paging response message.

For example, the processor may be configured to control the wireless device to check whether secondary cells (SCells) of master cell group (MCG) and/or secondary cell group (SCG) support a network slice for the MT service. Based on that a specific cell among the SCells supports the network slice for the MT service, the processor may be configured to control the wireless device to include a cell identity of the specific cell in the paging response message.

For example, the paging response message may include a group ID for network slices assigned for the MT service.

For example, the processor may be configured to control the wireless device to determine whether a serving cell supports a network slice assigned for the MT service based on the information related to the MT service. The processor may be configured to control the wireless device to include an indication, informing that the network slice assigned for the MT service is not supported by the serving cell, in the paging response message, based on the determination.

For example, the MT service may include at least one of a massive Internet of Things (mIoT) service, an enhanced Mobile Broadband (eMBB) service, an Ultra-Reliable and Low Latency Communications (URLLC) service, a Vehicle-to-Everything (V2X) service, an Internet service, and/or an Internet Protocol (IP) Multimedia Subsystem (IMS) service.

For example, the wireless device may be in RRC_INACTIVE. In this case, the paging response message may be an RRC resume request message.

For example, the wireless device may be in RRC_IDLE. In this case, the paging response message may be an RRC setup request message or a service request message.

According to some embodiments of the present disclosure, the information related to the MT service may include a specific Slice/Service Type (SST) related to a network slice assigned for the MT service. The processor may be configured to control the wireless device to check whether the specific SST is matched with a Configured S-NSSAI and/or an Allowed S-NSSAI stored in the wireless device.

For example, based on determining that the specific SST is matched with a certain Configured S-NSSAI, and the certain Configured S-NSSAI is not allowed in a serving cell, the processor may be configured to control the wireless device to include information on the certain Configured S-NSSAI in the paging response message.

For example, based on determining that the specific SST is matched with a certain Allowed S-NSSAIs of a serving cell, the processor may be configured to control the wireless device to include an indication informing that the serving cell supports the network slice assigned for the MT service in the paging response message.

For example, the information related to the MT service may include at least one of (1) information on an S-NSSAI related to a network slice assigned for the MT service, (2) information on a service type of the MT service, and/or (3) information on a group identity of network slices assigned for the MT service.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for paging procedure considering network slicing in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to receive, from a network, a paging message including information related to a mobile terminated (MT) service. The stored a plurality of instructions may cause the wireless device to transmit, to the network, a paging response message including information on Single-Network Slice Selection Assistance Information (S-NSSAI) for the MT service. The stored a plurality of instructions may cause the wireless device to receive, from the network, the MT service from a cell related to the S-NSSAI. The cell may be determined based on the paging response message.

For example, the stored a plurality of instructions may cause the wireless device to check whether secondary cells (SCells) of master cell group (MCG) and/or secondary cell group (SCG) support a network slice for the MT service. Based on that a specific cell among the SCells supports the network slice for the MT service, the stored a plurality of instructions may cause the wireless device to include a cell identity of the specific cell in the paging response message.

For example, the paging response message may include a group ID for network slices assigned for the MT service.

For example, the stored a plurality of instructions may cause the wireless device to determine whether a serving cell supports a network slice assigned for the MT service based on the information related to the MT service. The stored a plurality of instructions may cause the wireless device to include an indication, informing that the network slice assigned for the MT service is not supported by the serving cell, in the paging response message, based on the determination.

For example, the MT service may include at least one of a massive Internet of Things (mIoT) service, an enhanced Mobile Broadband (eMBB) service, an Ultra-Reliable and Low Latency Communications (URLLC) service, a Vehicle-to-Everything (V2X) service, an Internet service, and/or an Internet Protocol (IP) Multimedia Subsystem (IMS) service.

For example, the wireless device may be in RRC_INACTIVE. In this case, the paging response message may be an RRC resume request message.

For example, the wireless device may be in RRC_IDLE. In this case, the paging response message may be an RRC setup request message or a service request message.

According to some embodiments of the present disclosure, the information related to the MT service may include a specific Slice/Service Type (SST) related to a network slice assigned for the MT service. The stored a plurality of instructions may cause the wireless device to check whether the specific SST is matched with a Configured S-NSSAI and/or an Allowed S-NSSAI stored in the wireless device.

For example, based on determining that the specific SST is matched with a certain Configured S-NSSAI, and the certain Configured S-NSSAI is not allowed in a serving cell, the stored a plurality of instructions may cause the wireless device to include information on the certain Configured S-NSSAI in the paging response message.

For example, based on determining that the specific SST is matched with a certain Allowed S-NSSAIs of a serving cell, the stored a plurality of instructions may cause the wireless device to include an indication informing that the serving cell supports the network slice assigned for the MT service in the paging response message.

For example, the information related to the MT service may include at least one of (1) information on an S-NSSAI related to a network slice assigned for the MT service, (2) information on a service type of the MT service, and/or (3) information on a group identity of network slices assigned for the MT service.

According to some embodiments of the present disclosure, the stored a plurality of instructions may cause the wireless device to be in communication with at least one of a user equipment, a network, or an autonomous vehicle other than the wireless device.

Hereinafter, a method performed by a base station (BS) for paging procedure considering network slicing in a wireless communication system, according to some embodiments of the present disclosure, will be described.

The BS may receive, from a core network (CN), an indication for a mobile terminated (MT) service. The BS may transmit, to a wireless device, a paging message including information related to the MT service. The BS may receive, from the wireless device, a paging response message including information on S-NSSAI for the MT service. The BS may transmit, to the wireless device, a mobility message without performing UE context retrieving procedure.

For example, the information related to the MT service may include a specific Slice/Service Type (SST) related to a network slice assigned for the MT service.

For example, in the UE context retrieving procedure, the BS may transmit, to a last serving RAN node, a retrieve UE context request and receive, from the last serving RAN node, a retrieve UE context response.

Hereinafter, a base station (BS) for paging procedure considering network slicing in a wireless communication system, according to some embodiments of the present disclosure, will be described.

The BS may include a transceiver, a memory, and a processor operatively coupled to the transceiver and the memory.

The processor may be configured to control the transceiver to receive, from a core network (CN), an indication for a mobile terminated (MT) service. The processor may be configured to control the transceiver to transmit, to a wireless device, a paging message including information related to the MT service. The processor may be configured to control the transceiver to receive, from the wireless device, a paging response message including information on S-NSSAI for the MT service. The processor may be configured to control the transceiver to transmit, to the wireless device, a mobility message without performing UE context retrieving procedure.

For example, the information related to the MT service may include a specific Slice/Service Type (SST) related to a network slice assigned for the MT service.

For example, in the UE context retrieving procedure, the BS may transmit, to a last serving RAN node, a retrieve UE context request and receive, from the last serving RAN node, a retrieve UE context response.

The present disclosure can have various advantageous effects.

According to some embodiments of the present disclosure, a wireless device could perform paging procedure considering network slicing efficiently.

According to some embodiments of the present disclosure, the UE may transmit the intended slice information for DL data in a paging response message, so that the network can quickly decide, without UE context, whether the UE needs to move to another cell or the UE can provide MT service in the serving cell. This mechanism can reduce paging overhead and make the network controlled mobility possible during a paging procedure.

In other words, according to the present disclosure, the paging overhead could be reduced by not including the S-NSSAI in the paging. In addition, the mobility delay could be reduced because the network could control the UE mobility without the UE context retrieving procedure.

For example, the paging overhead can be reduced by receiving the short identity for the wireless device to distinguish only the MT service type.

For example, by transmitting the network slice information of the wireless device in the paging response, the network can determine whether the mobility of the wireless device is required before UE context retrieving process.

For example, delay for providing service can be shortened by quickly moving to a cell that can provide the service when necessary.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising,
    entering into an idle state or an inactive state;
    receiving, from a network, a paging message including (i) information related to a mobile terminated service and (ii) information related to a network slice for the mobile terminated service;
    determining that a serving cell does not support the network slice for the mobile terminated service;
    transmitting, to the network, a paging response message including (i) information informing that the network slice for the mobile terminated service is not supported by the serving cell and (ii) information related to one or more cells supporting the network slice for the mobile terminated service; and
    receiving, from the network, the mobile terminated service from the one or more cells supporting the network slice,
    wherein the paging response message is a radio resource connection (RRC) setup request message or an RRC resume request message.

2. The method of claim 1, wherein the method further comprises, checking whether secondary cells (SCells) of master cell group (MCG) and/or secondary cell group (SCG) support a network slice for the MT service.

3. The method of claim 1, wherein the mobile terminated service includes at least one of a massive Internet of Things (mIoT) service, an enhanced Mobile Broadband (eMBB) service, an Ultra-Reliable and Low Latency Communications (URLLC) service, a Vehicle-to-Everything (V2X) service, an Internet service, and/or an Internet Protocol (IP) Multimedia Subsystem (IMS) service.

4. The method of claim 1, wherein information related to the network slice for the mobile terminated service includes a specific Slice/Service Type (SST) related to the network slice for the mobile terminated service.

5. The method of claim 4, wherein the method further comprises,
    storing at least one Single-Network Slice Selection Assistance Information (S-NSSAI); and
    checking whether the specific SST is matched with the stored at least one S-NSSAI.

6. The method of claim 1,
    wherein the paging message further includes information on a service type of the mobile terminated service.

7. The method of claim 1, wherein the wireless device is in communication with at least one of a user equipment, a network, or an autonomous vehicle other than the wireless device.

8. A wireless device in a wireless communication system comprising:
    a transceiver;
    a memory; and
    at least one processor operatively coupled to the transceiver and the memory, and adapted to:
    enter into an idle state or an inactive state;
    receive, from a network, a paging message including (i) information related to a mobile terminated service and (ii) information related to a network slice for the mobile terminated service;
    determine that a serving cell does not support the network slice for the mobile terminated service;
    transmit, to the network, a paging response message including (i) information informing that the network slice for the mobile terminated service is not supported by the serving cell and (ii) information related to one or more cells supporting the network slice for the mobile terminated service; and receive, from the network, the mobile terminated service from the one or more cells supporting the network slice, wherein the paging response message is a radio resource connection (RRC) setup request message or an RRC resume request message.

\* \* \* \* \*